March 3, 1970     U. E. VOETTER     3,498,377
WELL COMPLETION METHODS AND APPARATUS
Filed Aug. 1, 1968     2 Sheets-Sheet 2
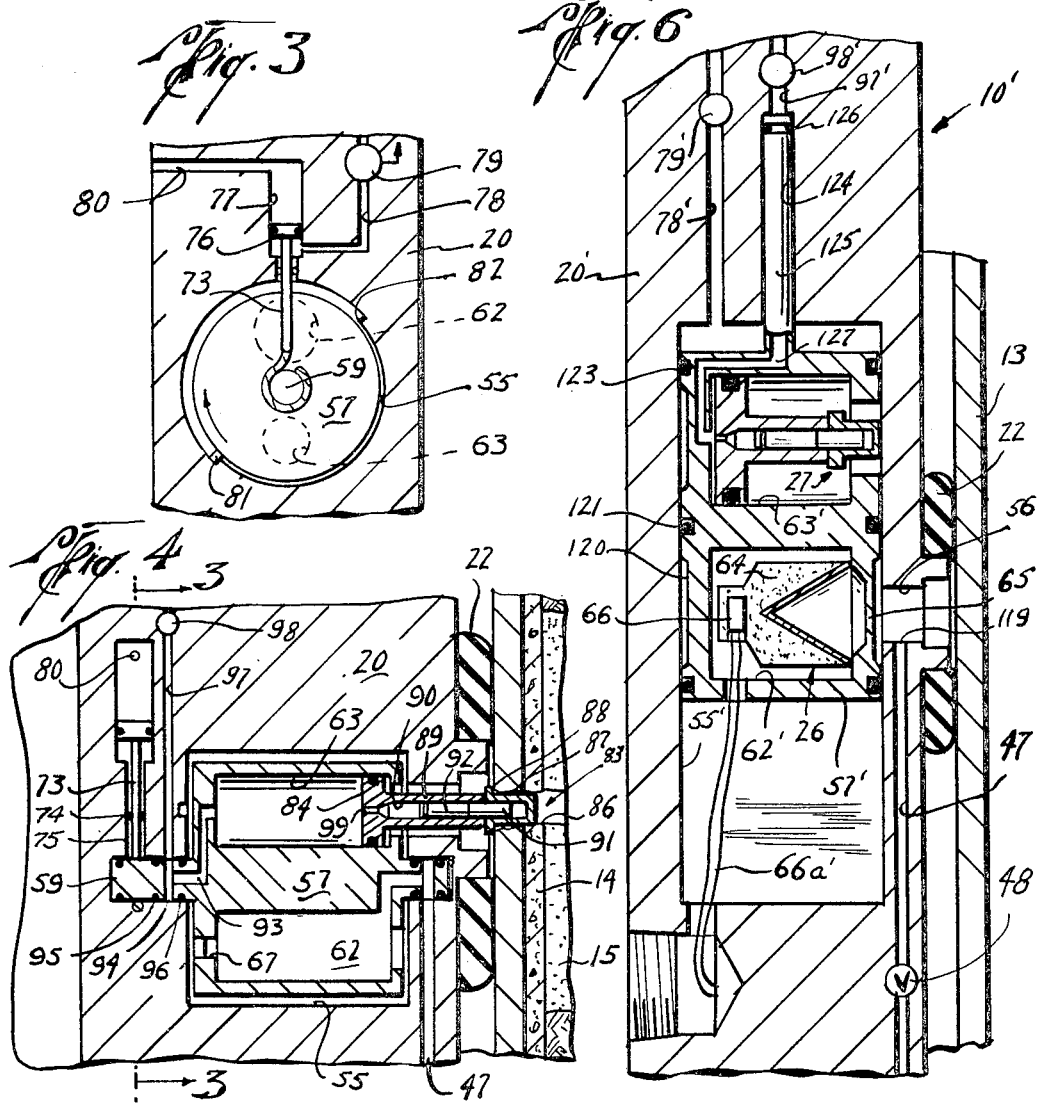
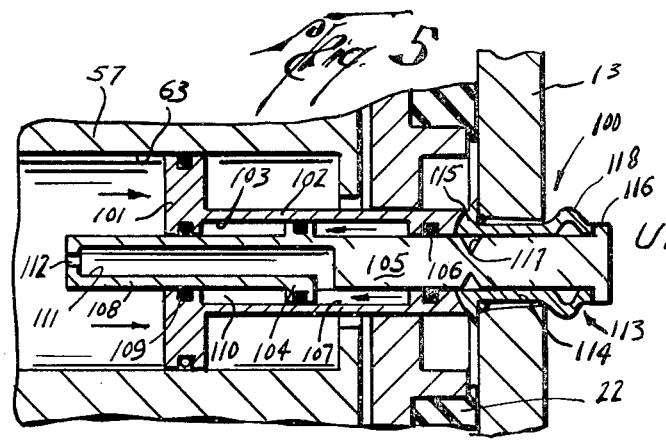
Ulrich E. Voetter
INVENTOR.
BY
ATTORNEY

United States Patent Office 3,498,377
Patented Mar. 3, 1970

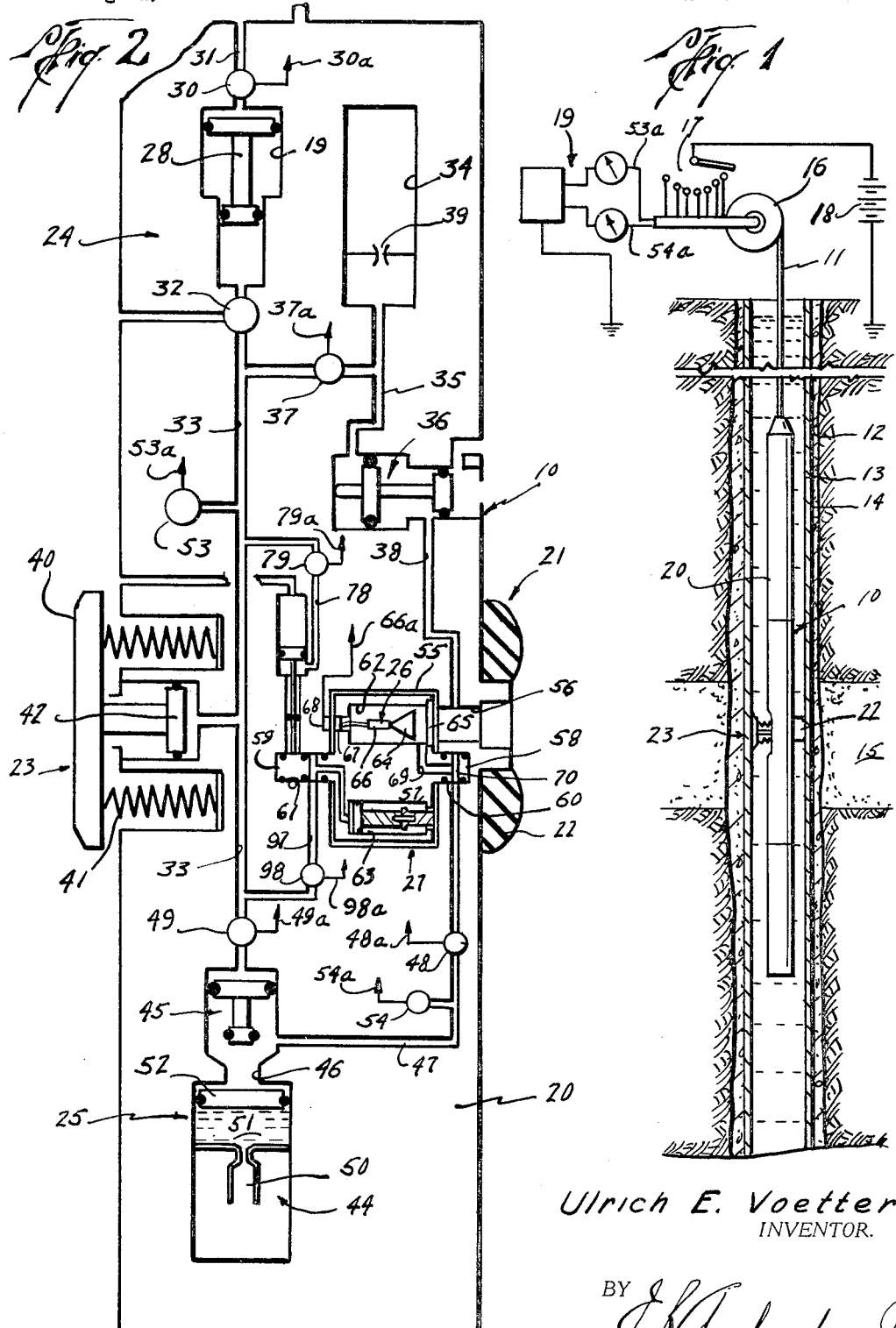

3,498,377
WELL COMPLETION METHODS AND APPARATUS
Ulrich E. Voetter, Houston, Tex., assignor to Schlumberger Technology Corporation, New York, N.Y., a corporation of Texas
Filed Aug. 1, 1968, Ser. No. 749,421
Int. Cl. E21b 43/11, 47/06
U.S. Cl. 166—250                                   4 Claims

ABSTRACT OF THE DISCLOSURE

This application discloses new and improved methods and apparatus for testing earth formations traversed by a cased well bore and then reliably plugging the resultant perforations in the casing when the tests are completed.

---

When it is desired to test earth formations that are traversed by a cased well bore or obtain fluid samples therefrom, fluid-testing or sampling apparatus such as that disclosed in the Whitten Patent No. 3,104,712 is usually employed. Tools of this nature typically include one or more annular sealing members that are urged against the well casing and held there in sealing engagement to isolate the adjacent wall portions thereof. Upon command from the surface, a corresponding number of shaped charges enclosed within the tool are selectively actuated to develop perforating jets that respectively pass through their associated sealing member and produce testing perforations through the casing and cement to gain access to the earth formations. Then, once it is believed that a sufficient fluid sample has been collected in a sample chamber in the tool, the sample chamber is closed and the tool is returned to the surface for examination of the fluid sample.

Once the fluid-sampling or testing apparatus is withdrawn from the cased well bore, the casing perforations are usually closed-off in one way or another. In one manner of doing this, the apparatus can, of course, be removed and the testing perforations sealed by conventional "squeeze-cementing" procedures. This, however, is obviously a time-consuming and an expensive solution that is not at all welcomed by the owner of the well. Alternatively, although cementing apparatus (such as shown in the Van Ness Patent No. 3,121,459) can be included with the testing or sampling apparatus and has been quite successful where only small amounts of cement are required, such cementing apparatus is not feasible if either the nature of the formation or an imperfect bond between the casing and cement sheath require large volumes of cement to close the testing perforations. Such factors cannot, of course, be determined until after the tool is withdrawn. Thus, no practical solution has been found heretofore to insure that such perforations are reliably closed without resorting to the aforementioned squeeze-cementing procedures.

Accordingly, it is an object of the present invention to provide new and improved fluid-sampling or testing apparatus including selectively-operable means for reliably plugging testing perforations made through the casing once a testing or sampling operation has been completed. It is a further object of the present invention to provide new and improved methods for testing or obtaining connate fluid samples from earth formations traversed by a cased well bore and then reliably plugging off the resultant perforations through the well casing at the conclusion of the tests.

These and other objects of the present invention are provided by a fluid-sampling or testing tool having selectively-operable perforating means operatively associated with selectively-extendible plugging means for blocking the casing perforation at the conclusion of the fluid-sampling or testing operation. In practicing the methods of the present invention, a portion of the casing of a well bore is isolated from well-bore fluids. Then, a suitable testing perforation is made through the isolated wall portion to establish flow communication with the earth formations therebeyond. Once communication is established, one or more test measurements are made either alone or in conjunction with the collection of fluid samples. Then, once the tests are concluded, an insertable plug is sealingly fitted in the casing perforation before the testing or sampling tool is withdrawn. Accordingly, when the methods of the present invention are employed with the fluid-sampling or testing apparatus of the invention, the testing perforation will be tightly plugged to block further fluid communication therethrough.

The novel features of the present invention are set forth with particularity in the appended claims. The invention, together with further objects and advantages thereof, may be best understood by way of the following description of exemplary apparatus and methods employing the principles of the invention as illustrated in the accompanying drawings, in which:

FIGURE 1 depicts sample-taking or testing apparatus arranged in accordance with the invention as the apparatus might appear within a cased well bore during the practice of the methods of the present invention;

FIGURE 2 is a simplified, schematic representation of the new and improved apparatus illustrated in FIGURE 1;

FIGURE 3 is a cross-sectional view taken along the lines 3—3 of FIGURE 4;

FIGURE 4 is a cross-sectional view in elevation of an enlarged portion of the apparatus of FIGURE 1 and illustrates a somewhat schematic representation of a preferred embodiment of selectively-operable plugging means and perforating means arranged in accordance with the present invention as a casing perforation is being plugged;

FIGURE 5 is an enlarged view similar to FIGURE 4 but illustrates an alternative embodiment of selectively-operable plugging means incorporating the principles of the present invention; and FIGURE 6 is an enlarged view of still another embodiment of a selectively-movable carrier for the perforating means and plugging means of the present invention.

Turning now to FIGURE 1, fluid-sampling or testing apparatus 10 incorporating the principles of the present invention is shown suspended from a multi-conductor cable 11 in borehole 12 having a casing 13 set therein and secured in the usual fashion by an external sheath of cement 14. The fluid-sampling apparatus 10 has been positioned adjacent a particular earth formation 15 for collecting a sample of connate fluids therefrom. The cable 11 is spooled from a winch 16 at the earth's surface, with some of its conductors being connected to a switch 17 for selective connection to a power source 18 and others being connected to typical indicating-and-recording apparatus 19. The fluid-sampling apparatus 10 is comprised of an elongated body 20 which, to facilitate its manufacture and assembly, may be arranged in tandemly connected sections as shown. Sample-admitting means 21 including an annular sealing member 22 are mounted along one side of the body 20 diametrically opposite from selectively-extendible wall-engaging means 23.

As illustrated in FIGURE 2, the fluid-sampling or testing apparatus 10 is basically comprised of a hydraulic system 24 which, by utilizing the hydrostatic pressure of the well-control fluids, develops an increased hydraulic pressure for actuating the apparatus, the sample-admitting means 21, and sample-collecting means 25 for obtaining samples of connate fluids. The apparatus 10 further includes the perforating means 26 and perforation-plugging means 27 of the present invention which, as will become apparent, are selectively movable into and out of alignment with the sealing member 22 for operation while the sealing member is sealingly engaged with the casing 13. Inasmuch as the particular details of most of its various components are not necessary for fully understanding the present invention, the fluid-sampling or testing apparatus 10 is shown only schematically in FIGURE 2. Since these components are fully disclosed in either the aforementioned Whitten or Van Ness patents or in the various patents referred to therein, the forthcoming descriptions of these components will be limited to only a brief explanation of their basic operations to show their general relation to one another as well as to the present invention.

Briefly stated, in practicing the present invention, after the apparatus 10 has been positioned adjacent the formation 15, the hydraulic system 24 is first activated from the surface. The wall-engaging means 23 are then extended to shift the apparatus 10 laterally and sealingly engage the sealing member 22 against the inner wall of the casing 13. Once the sealing member 22 is set, the perforating means 26 of the present invention are operated to make a testing perforation through the casing 13 and a sample of connate fluids is withdrawn from the formation 15 and collected by the sample-collecting means 25. The perforation-plugging means 27 of the present invention are then moved into alignment with the sealing member 22 and operated to expand a tightly-fitting plug into the casing perforation. Thereafter, the pressure in the hydraulic system 24 is relieved to disengage the wall-engaging means 23 and sealing member 22 for retrieval of the apparatus 10.

The hydraulic system 24 used in the apparatus 10 may, for example, be generally of the type described in the Desbrandes Patent No. 3,011,554 and includes a pressure-developing piston 28 slidably mounted in a stepped cylinder 19. An electrically-actuated "mud" valve 30 (such as shown in FIG. 4 of the Desbrandes patent) is selectively operable to admit well-control fluids through a passage 31 into the cylinder 29 above the piston 28. Thus, whenever the mud valve 30 is opened, the hydrostatic pressure of the well-control fluids will drive the piston inwardly to develop a somewhat greater hydraulic pressure in that portion of the cylinder 19 below the piston which is filled with a typical hydraulic fluid. A pressure-regulating valve 32 (such as shown in FIGS. 8 and 8A of the Desbrandes patent) is responsive to the hydrostatic pressure of the well-control fluids to maintain the hydraulic pressure in an outlet conduit 33 downstream of the valve at a predetermined differential above the hydrostatic pressure.

The hydraulic system 24 also includes a normally-empty "dump" chamber 34 for terminal reception of the hydraulic fluid, with this chamber being connected by a branch passage or conduit 35 to a normally-closed, piston-actuated, pressure-equalizing valve 36 and, via a normally-closed, electrically-actuated valve 37 (such as shown in FIG. 7 of the Desbrandes patent), to the main hydraulic conduit 33. As illustrated in FIGURE 2, the equalizing valve 36 normally blocks fluid communication through a conduit 38 from the sample-admitting means 21 and the exterior of the apparatus 10. Thus, whenever hydraulic fluid is admitted to the branch conduit 35, the equalizing valve 36 will be shifted outwardly to admit well-control fluids into the conduit 38 and equalize any pressure differential across the sealing member 22.

The dump chamber 34 is normally at atmospheric pressure and is divided into larger and smaller compartments separated by an orifice 39. When the apparatus 10 is to be retrieved, the control valve 37 is opened to admit hydraulic fluid from the main conduit 33 to the smaller compartment of the dump chamber 34 as the fluid is simultaneously directed to the pressure-equalizing valve 36. Although the pressure of the hydraulic fluid will immediately begin dropping when the valve 37 is opened, the lower compartment of the dump chamber and the orifice 39 are suitably sized to open the equalizing valve 36 before the hydraulic pressure drops to its final level. Once the equalizing valve 36 opens, the hydrostatic pressure will be equalized across the sealing member 22 to facilitate the retrieval of the apparatus 10.

The extendible wall-engaging means 23 on the opposite side of the body 20 from the sealing member 22 are adapted to shift the apparatus 10 laterally and engage the sealing member 22 against the casing 13 prior to taking fluid samples. The hydraulically-actuated wall-engaging means 23 are comprised of an extendible back-up shoe 40 which is normally retracted against the body 20 by one or more springs 41. A piston actuator 42 is connected by a branch conduit 43 to the main hydraulic conduit 33. Thus, whenever the mud valve 30 is opened, the increased hydraulic pressure in the main conduit 33 will urge the piston actuator 42 outwardly to extend the back-up shoe 40 against the adjacent inner wall of the casing 13.

The sample-collecting means 25 include a sample-receiving chamber 44 and a normally-open, hydraulically-actuated closure valve 45 (such as shown in FIG. 10 of the Desbrandes patent) adapted for movement into engagement with a complementary valve seat 46 in the entrance of the chamber to terminate flow communication with a fluid conduit 47 leading to the sample-admitting means 21 that is initially closed by a selectively-operable valve 48. The closure valve 45 is normally held open but, once it has been actuated, it will be latched in a closed position. To close the valve 45, a normally-closed, electrically-actuated valve 49 connects the closure valve 45 to the main hydraulic conduit 33. Thus, to close the sample chamber 44, opening of the control valve 49 will admit fluid from the hydraulic conduit 33 to shift the piston-actuated valve 45 downwardly into sealing engagement with the valve seat 46.

The sample-receiving chamber 44 includes upper and lower compartments separated by a partition having an orifice 50 therein. A liquid cushion 51, such as water, is initially disposed in the upper compartment of the sample chamber 44 and isolated from the upper portion thereof by a floating piston 52 which is sealingly received within the upper compartment. Since its lower compartment is initially empty and is at a reduced or atmospheric pressure, connate fluids entering the sample-receiving chamber 44 from the sample conduit 47 will move the piston 52 downwardly at a rate regulated by the discharge of the water cushion 51 through the orifice 50 and into the lower compartment of the chamber.

Pressure transducers 53 and 54 are provided to continuously monitor the pressure in the hydraulic system 24 and sample-admitting means 21. These transducers 53 and 54 may, for example, be of the type shown in FIG. 9 of the Desbrandes patent and are connected by electrical leads 53a and 54a in the cable 11 to the pressure indicating-and-recording apparatus 19 (FIGURE 1) at the surface of the earth. Thus, by observing the variations of these pressure measurements, the operator can monitor the progress of the operating cycle of the fluid-sampling apparatus 10.

As best seen in FIGURES 2–4, in one preferred arrangement of the perforating means 26 and plugging means 27 of the present invention, a generally-cylindrical lateral chamber 55 is formed in the tool body 20 and connected to an eccentrically-located lateral bore 56 opening to the exterior of the body that is aligned with the central opening through the annular sealing member 22. A cylindrical body 57 is movably disposed in the lateral chamber 55 and adapted for rotation therein about a lateral axis that is parallel to and longitudinally spaced below the lateral axis of the lateral bore 56. To support the body 57 for rotation about its axis of rotation, aligned longitudinal axles 58 and 59 are mounted on the front and rear of the cylindrical body and journaled in axially-aligned bores 60 and 61 in the front and rear walls of the chamber 55. First and second angularly-displaced chambers 62 and 63 are formed in the rotatable body 57 and respectively spaced laterally from the rotational axis of the cylindrical body a distance corresponding generally to the longitudinal spacing between the rotational axis and the central axis of the lateral bore 56.

The cylindrical body 57 is operatively arranged so that the lateral chamber 62 therein enclosing the selectively-operable perforating means 26 is initially aligned with the lateral bore 56. In this embodiment, the perforating means 26 include a typical shaped charge 64 that is disposed in the chamber 62 behind a thin-walled closure 65 and has its perforating axis aligned with the lateral bore 56 and central opening of the sealing member 22. The shaped charge 64 is connected to electrically-responsive detonating means such as a blasting cap 66 in the chamber 62 that is operable from the surface by way of a conductor 66a in the suspension cable 11. In one manner of making effective electrical connections to the blasting cap 66, the conductor 66a is divided and its two parts respectively connected to opposed electrical contacts 67 and 68 on the rear of the cylindrical body 57 and the rear wall of the lateral chamber 55, respectively, that are angularly aligned with one another so long as the cylindrical body remains in its illustrated initial position.

Accordingly, with the cylindrical body 57 in its initial position illustrated in FIGURE 2, the shaped charge 64 is positioned so that, upon its detonation, the resulting perforating jet will puncture the closure member 65 and pass through the lateral bore 56 and central opening of the sealing member 22 to perforate the isolated wall portion of the casing 13 therebeyond. To conduct connate fluids entering the lateral bore 56 to the sampling conduit 47, a passage 69 is formed in the cylindrical body 57 from the lateral chamber 62 and terminated in a port 70 in the forward axle 58 between spaced sealing members 71 and 72 around the axle and straddling the entrance of the conduit 47 into the lateral bore 60.

In one manner of selectively rotating the cylindrical body 57, one end of a flexible cable 73 is secured to and at least partially wrapped around the rearward axle 59. The other end of the cable 73 is passed through a suitable fluid seal 74 and a complementary passage 75 in the tool body 20 and secured to a piston 76 sealingly disposed in a piston chamber 77 in the tool body. A pressure conduit 78 between the hydraulic conduit 33 and the lower portion of the piston chamber 77 below the piston 76 is normally closed by a selectively-operable valve 79. Another conduit 80 communicates the upper portion of the piston chamber 77 with the exterior of the tool body 20. Accordingly, as best seen in FIGURE 3, upon opening of the normally-closed valve 79, the pressured hydraulic fluid entering the piston chamber 77 will move the piston 76 upwardly and, as the cable 73 unwraps, rotate the cylindrical body 57 from its initial position to another angular position as established by engagement of a stop 81 on the cylindrical body with a stop 82 projecting into the lateral chamber 55.

Upon rotation of the cylindrical body 57 to this other position, the lateral chamber 63 and the selectively-operable plugging means 27 disposed therein will be brought into alignment with the lateral bore 56 and the central opening of the sealing member 22. As best seen in FIGURE 4, the plugging means 27 are basically comprised of an expansible plug 83 which, by means of an adhesive or solder, is detachably mounted on the forward end of a normally-retracted piston member 84 disposed in the lateral chamber 63 and carrying a selectively-movable mandrel 85 adapted for snugly expanding the plug into sealing engagement with the perforation 86 made in the casing 13 by the previous detonation of the shaped charge 64.

In the preferred embodiment illustrated, the expansible plug 83 is made of some yieldable material such as a soft metal, a plastic, or an elastomer. Preferably, the plug 83 has a hollow shank portion 87 with a closed forward end initially sized for easy insertion into a casing perforation, as at 86, and an enlarged rearward portion 88 of about the same diameter as the external diameter of an axially-aligned tubular extension 89 projecting forwardly from the piston 84. The expander or mandrel 85 is slidably disposed in the axial bore 90 of the tubular extension 89 and has a forwardly-converging tapered nose 91 suitably sized to fit within the hollow shank 87 and, upon forward movement of the mandrel in relation to the plug 83, expand the shank tightly into the casing perforation 86. To selectively move the expanding mandrel 85, a cylindrical piston 92 is slidably sealed within the bore 90 of the extension 89 and adapted to move forwardly therein upon application of hydraulic pressure into the rearward portion of the axial bore 90.

To selectively actuate the plugging means 27, a passage 93 is formed in the rotatable body 57 from the rear of the lateral chamber 63 to a port 94 in the rearward axle 59 between spaced sealing members 95 and 96 around the axle and straddling the entrance of a conduit 97 into the lateral bore 61. The other end of the conduit 97 is connected to the main hydraulic conduit 33 by way of a selectively-operable normally-closed valve 98 which, upon being opened, will admit pressured hydraulic fluid into the rear of the lateral chamber 63.

Accordingly, once the shaped charge 64 has been detonated to produce the casing perforation 86 and the cylinder 57 is subsequently rotated to bring the lateral bore 56 and the central opening of the sealing member 22, the plugging means 27 will be aligned with the testing perforation. Upon opening of the valve 98, pressured hydraulic fluid is admitted into the lateral chamber 63 to urge the piston 84 forwardly from its initial position at the rear of the lateral chamber. Although an orifice 99 in the piston 84 will also begin admitting the pressured hydraulic fluid into the axial bore 90 of the tubular extension 89, the orifice is sized to delay any significant buildup of pressure therein until the piston 84 has carried the plug 83 sufficiently forwardly for the shank portion 87 to be inserted into the perforation 86. Thus, only after the enlarged head portion 88 has been pressed against the inner wall of the casing 13 by the forward movement of the piston 84 will the hydraulic pressure inside of the axial bore 90 sufficiently increase to begin moving the piston 92 forwardly. Forward movement of the piston 92 in relation to the extended piston extension 89 will, of course, be effective to drive the expanding mandrel 85 further into the shank portion 87 and expand it outwardly into a tight fit against the walls of the perforation 86. Thereafter, when the hydraulic pressure is relieved, the pistons 84 and 92 will be retracted to leave the plug 83 tightly held into the perforation 86 by the mandrel 85.

Turning now to FIGURE 5, an alternative embodiment is shown of plugging means 100 also arranged in accordance with the present invention and which, if desired, may be substituted for the plugging means 27. As seen in the drawing, the plugging means 100 are operatively disposed in the lateral chamber 63 of the rotatable body 57 and include a first piston member 101 having a tubular forward extension 102 with an axial bore 103 in which is movably disposed a second piston member 104. This second piston member 104 has a forward axial extension 105 projecting beyond the forward end of the tubular extension 102 and fluidly sealed in relation thereto by a seal 106 to define a sealed space 107 in the axial bore 103 ahead of the piston 104. In a similar fashion, an axial extension 108 from the rear of the second piston 104 is passed through a seal 109 in the axial bore 103 and projects to the rear of the piston 101 to define a second sealed space 110 in the axial bore 103 to the rear of the second piston. A flow passage 111 is formed in the second piston 104 to provide communication between the isolated space 107 and, by way of an orifice 112 in the rear of the rearward extension 108, the lateral chamber 63 to the rear of the first piston 101. An expansible plug 113 having a tubular shank 114 and a rearward head portion 115 is detachably mounted on the forward end of the forward piston extension 105, with the plug head being abutted against the forward end of the outer piston extension 102. The inner piston extension 105 passes completely through the tubular shank portion 114 and is terminated in an enlarged-diameter flange 116 against which the forward end of the hollow shank is abutted. For reasons that will subsequently become apparent, the inner piston extension 105 is selectively weakened, as by a circumferential notch 117, so as to fail upon application of a predetermined tension force on the forward piston extension.

Accordingly, after the shaped charge 64 has been actuated to produce the perforation 86 and the rotatable body 57 is moved to bring the chamber 63 into alignment with the testing perforation, the control valve 98 is opened. The hydraulic fluid initially entering the chamber 63 will be effective to move the piston 101 forwardly to insert the shank portion 114 into the perforation 86 as shown in FIGURE 5. By virtue of the orifice 112 and the forward movement of the piston 101, the piston 104 will remain stationary relative to the outer piston until the outer piston has halted and the plug head 115 is forced against the inner wall of the casing 13. The hydraulic pressure in the piston passage 111 and enclosed space 107 will, however, increase at a rate determined by the size of the orifice 112. The hydraulic pressure in the forward enclosed space 107, of course, ultimately builds up; and, since the rearward enclosed space 110 is at atmospheric pressure, the inner piston member 104 will then be urged rearwardly in relation to the now-stationary outer piston 101 which is pressing the plug head 115 tightly against the inner wall of the casing 13. Accordingly, the flanged end 116 will begin moving rearwardly to expand or upset the forward end of the yieldable shank 114, as seen at 118, against the outer wall of the casing 13. Then, once the upset 118 is formed, the continuing rearwardly-directed force on the inner piston member 104 will ultimately be effective to part the forward extension 105 at the notch 117 and leave the forward portion of the extension within the plug 113. Hereagain, once the pressure is relieved in the hydraulic system 24, the pistons 101 and 104 will be retracted into the chamber 63.

Turning now to FIGURE 6, an alternative arrangement is depicted for selectively positioning the perforating means 26 and plugging means 27 (or 100) for practicing the present invention. Inasmuch as the tool 10' is otherwise the same as the tool 10, only the portion of the tool body 20' enclosing the perforating means 26 and plugging means 27 is shown in the drawing. In general, the basic distinction of the embodiment illustrated in FIGURE 6 is that the perforating means 26 and plugging means 27 (or 100) are selectively shifted linearly along a selected axis rather than rotated thereabout.

Accordingly, the generally-cylindrical chamber 55' is formed about the longitudinal axis of the tool body 20', with the lateral bore 56 intersecting the chamber. The movable cylindrical body 57' is operatively disposed within the chamber 55' and adapted for sliding movement therein between first and second longitudinally-spaced positions so as to selectively align the spaced lateral chambers 62' and 63' with the lateral bore 56 and the central opening in the sealing member 22. To establish fluid communication with the sample-collecting means 25 once the shaped charge 64 is detonated, the flow passage 47 is terminated in a port 119 opening into the chamber 55' in the proximity of the intersection of the lateral bore 56 therewith. The body 57' is preferably reduced in external diameter, as at 120, around the lateral chamber 62' and between spaced sealing members 121 and 122 which isolate the port 119.

A sealing member 123 around the upper end of the cylindrical body 57' seals the upper portion of the chamber 55' so that whenever the valve 79' is opened, admission of hydraulic fluid into the upper chamber portion will selectively move the body from is initial position to its final position. Once the body 57' has been selectively moved to its final position, the lateral chamber 63' therein will be aligned with the bore 56 in readiness for operation of the plugging means 27 (or 100). To conduct hydraulic fluid to the lateral chamber 63', the conduit 97' is terminate in an enlarged axial bore 124 that opens into the top of the chamber 55' and complementally receives an upright tubular extension 125 on top of the movable body 57'. A seal 126 around the tubular extension 125 is fluidly sealed within the bore 124 so that once the body 57' is moved to its final position and the valve 98' is opened, hydraulic fluid will be admitted to the rear of the lateral chamber 63' by way of a passage 127 through the tubular extension and movable body. Admission of hydraulic fluid to the chamber 63' will, of course, selectively actuate the plugging means 27 (or 100) in the same manner as already described.

Accordingly, to practice the methods of the present invention with either the apparatus 10 or the apparatus 10', the tool is first positioned in the usual manner adjacent a formation as at 15 that is to be tested. To isolate a portion of the inner wall of the casing 13, the switch 17 is operated to open the control valve 30 and actuate the hydraulic system 24. Development of hydraulic pressure in the main hydraulic passage 33 is effective to extend the back-up shoe 41 against one side of the casing 13 and press the sealing member 22 tightly against the other side of the casing.

Once the sealing member 22 is firmly set against the casing 13 (as shown by the hydraulic pressure sensed by the transducer 53 and read at the surface on the indicating apparatus 19), the portion of the casing wall immediately in front of the central opening in the sealing member is isolated from the well bore fluids. The shaped charge 64 is then detonated by advancing the control switch 17 to its next position. Detonation of the shaped charge 64 punctures the closure plug 65 and produces the perforation 86 through the casing 13 and cement 14 into the formation 15 therebeyond.

Once access is gained into the formation 15, a sample of connate fluids therein is collected and a pressure measurement is made. To accomplish this, the switch 17 is again advanced to open the control valve 48 to allow whatever producible connate fluids there may be in the formation 15 to enter the sample chamber 44 as well as to measure their pressure (as sensed by the transducer 54). When it is believed that an adequate fluid sample has been collected in the chamber 44, the switch 17 is further advanced to actuate the valve 49 for moving the valve 45 into seating engagement with the valve seat 46.

To plug the testing perforation 86, the valve 79 is opened to rotate the body 57 (or shift the body 57') and bring the plugging means 27 (or 100) into alignment with the central opening in the sealing member 22. Once the plugging means 27 are in position, the control switch 17 is further advanced to open the valve 98 (or 98') to admit hydraulic fluid into the rear of the lateral chamber 63 (or 63'). As previously described, the hydraulic pressure in the lateral chamber 63 or (63') will be effective to first move the piston 84 (or 101) forwardly to insert the plug 83 (or 113) into the casing perforation 86. Once the plug 83 (or 113) is inserted into the perforation 86, the continuing build-up of hydraulic pressure through the orifice 99 (or 112) will be effective to secure the plug into sealing engagement with the perforation. In the first instance, the mandrel 85 is driven tightly into the hollow shank 87 of the plug 83; and, in the second instance, after the plug upset 118 is formed, the forward extension 105 is parted at the notch 117 to leave the tip of the forward extension in the plug shank 114.

In either instance, once the plug 83 (or 113) is sealingly engaged within the perforation 86, the control switch 17 is again advanced to open the control valve 37 to prepare the tool 10 (or 10') for withdrawal from the well bore 12. As previously described, as the hydraulic fluid is initially admitted to the conduit 35, the pressure-equalizing valve 36 will be opened and the hydraulic pressure will be reduced as the fluid enters the dump chamber 34. Then, once the orifice 39 has passed sufficient hydraulic fluid, the pressure in the main hydraulic conduit 33 will be reduced and the piston 42 and springs 41 will retract the back-up shoe 40. Similarly, reduction of the hydraulic pressure in the conduit 33 will retract the piston 84 (or 101). Once the hydraulic pressure is reduced (as indicated by the measurement provided by the transducer 53), the tool 10 (or 10') can be safely retrieved by reeling-in the cable 11.

Accordingly, it will be appreciated that the present invention has provided new and improved methods and apparatus for reliably plugging testing perforations at the conclusion of a pressure-measuring or sampling operation. By inserting an appropriately-shaped yieldable plug into the casing perforation and then expanding it into the casing perforation and then expanding it into snug engagement therein, it is readily apparent that the perforation will be reliably closed to prevent further entrance of connate fluids. To accomplish the new and improved methods, the apparatus of the present invention includes perforating means and plugging means that are operatively carried on a body adapted for selective movement. In one preferred embodiment of this apparatus, the body carrying the perforating means and plugging means is selectively rotatable from an initial position where the perforating means are operatively positioned to a second position where the plugging means are aligned with the perforation previously made by the perforating means. In the other disclosed preferred embodiment, this body is selectively movable between longitudinally-spaced positions to accomplish the purposes of the invention. In either situation, the plugging means include a yieldable plug member that is adapted to be selectively inserted and then expanded into sealing engagement within the testing perforation through the casing.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for completing a cased well bore traversing earth formations containing well-control fluids and comprising the steps of: packing-off a wall portion of a well casing to isolate a space adjacent to said wall portion from well-control fluids in the casing; perforating said packed-off wall portion to provide a testing passage therethrough in fluid communication with said isolated space and earth formations beyond the casing; and, thereafter, while said wall portion is still packed-off, driving an expansible plug into said testing passage to block further fluid communication therethrough.

2. The method of claim 1 further including the step of: before said expansible plug is driven into said testing passage, collecting a sample of connate fluids flowing from said earth formations into said isolated space.

3. The method of claim 1 further including the step of: before said expansible plug is driven into said testing passage, measuring the fluid pressure in said isolated space.

4. The method of claim 1 further including the steps of: before said expansible plug is driven into said testing passage, collecting a sample of connate fluids flowing from said earth formations through said testing passage and into said isolated space as well as measuring the pressure of such connate fluids flowing into said isolated space.

References Cited

UNITED STATES PATENTS

| 2,381,929 | 8/1945 | Schlumberger | 166—55.1 |
| 2,559,687 | 7/1951 | Thomas | 166—55.1 X |
| 2,614,633 | 10/1952 | Broyles | 166—55.1 |
| 3,104,712 | 9/1963 | Whitten | 166—264 X |
| 3,430,711 | 3/1969 | Taggart | 175—4.52 |
| 3,461,977 | 8/1969 | Taggart | 175—4.5 |

DAVID H. BROWN, Primary Examiner

U.S. Cl. X.R.

166—264; 175—4.53